(12) United States Patent
Iwata et al.

(10) Patent No.: US 7,040,148 B2
(45) Date of Patent: May 9, 2006

(54) EXHAUST TREATMENT APPARATUS

(75) Inventors: Yoshinari Iwata, Iwakura (JP); Masatake Shimizu, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/694,950

(22) Filed: Oct. 29, 2003

(65) Prior Publication Data
US 2004/0163453 A1 Aug. 26, 2004

(30) Foreign Application Priority Data
Oct. 29, 2002 (JP) .............................. 2002-314101

(51) Int. Cl.
*G01M 15/00* (2006.01)
(52) U.S. Cl. ................................... 73/118.1
(58) Field of Classification Search ............... 73/118.1, 73/116, 117.2, 117.3, 119 R, 23.31, 23.32
See application file for complete search history.

(56) References Cited

U.S. PATENT DOCUMENTS

| 6,085,582 | A * | 7/2000 | Tripathi et al. ............. 73/118.1 |
| 6,148,656 | A * | 11/2000 | Breton ....................... 73/23.31 |
| 6,176,125 | B1 * | 1/2001 | Hirano et al. .............. 73/118.1 |
| 6,382,014 | B1 * | 5/2002 | Breton ....................... 73/23.31 |
| 6,387,706 | B1 * | 5/2002 | Eden ........................... 436/127 |
| 6,439,040 | B1 * | 8/2002 | Garms et al. ............. 73/118.1 |
| 6,460,400 | B1 * | 10/2002 | Ichikawa ................... 73/23.31 |
| 6,470,732 | B1 * | 10/2002 | Breton ....................... 73/23.31 |
| 6,553,818 | B1 * | 4/2003 | Blumke et al. ............. 73/118.1 |
| 6,739,184 | B1 * | 5/2004 | Brazeau et al. ............. 73/118.1 |
| 6,860,143 | B1 * | 3/2005 | Yamazaki et al. .......... 73/118.1 |
| 6,862,927 | B1 * | 3/2005 | Craig et al. ................. 73/118.1 |
| 2003/0192369 | A1 * | 10/2003 | Brazeau et al. ............. 73/118.1 |
| 2004/0149009 | A1 * | 8/2004 | Brazeau et al. ............. 73/23.31 |
| 2004/0226354 | A1 * | 11/2004 | Schmidt ..................... 73/118.1 |

FOREIGN PATENT DOCUMENTS

| JP | 63-38877 | 2/1988 |
| JP | 06-050141 | 2/1994 |
| JP | 06-160243 | 6/1994 |
| JP | 09-194270 | 7/1994 |
| JP | 06-331502 | 12/1994 |
| JP | 08-005518 | 1/1996 |
| JP | 08-178803 | 7/1996 |
| JP | 09-126950 | 5/1997 |
| JP | 10-239216 | 11/1998 |

* cited by examiner

*Primary Examiner*—Eric S. McCall
(74) *Attorney, Agent, or Firm*—Finnegan, Henderson, Farabow, Garrett & Dunner

(57) ABSTRACT

An exhaust treatment apparatus has an arm rotatably supported on a test bed and a masking section provided at the distal end portion of the arm. The masking section is connected to an exhaust treatment section via an exhaust pipe. When the arm is turned to a test position from a standby position, the masking section faces an internal combustion engine with a predetermined gap therebetween. In this state, a masking-section cylinder presses the masking section toward the internal combustion engine to set the masking section in close contact with the internal combustion engine. As a result, the exhaust port of the internal combustion engine is connected to an inlet port provided in the masking section. Exhaust gas discharged from the exhaust port is supplied to the exhaust treatment section through the inlet port, the masking section and the exhaust pipe, and is treated in the exhaust treatment section.

11 Claims, 15 Drawing Sheets

1

EXHAUST TREATMENT APPARATUS

BACKGROUND OF THE INVENTION

The present invention relates generally to an exhaust treatment apparatus which treats exhaust discharged from an internal combustion engine when the engine is being tested.

At the time of manufacturing an internal combustion engine, a test for detecting assembly defects and the like is performed after predetermined stages. As this test is basically conducted while the internal combustion engine is running, it is necessary to treat exhaust gas discharged from the internal combustion engine. It is therefore typical to connect the internal combustion engine to be tested to an exhaust treatment apparatus for treating the exhaust gas from the engine via an exhaust manifold.

However, because the attachment and detachment of the exhaust manifold is generally done manually by a worker, conventional tests on internal combustion engines face an issue of low work efficiency. In addition, the exhaust manifold cannot be detached from the internal combustion engine until the heat from the exhaust manifold, which has become hot due to the exhaust gas from the internal combustion engine, has sufficiently discharged. To continuously conduct tests on multiple internal combustion engines on an assembly line in a factory, it is therefore necessary to prepare a plurality of exhaust manifolds and use the manifolds one after another. This inevitably increases the number of steps for attaching and detaching the exhaust manifolds and the cost for the manifolds.

Prior art documents pertinent to the present invention are Japanese Patent Laid-Open Publication No. Sho 63-38877/1988 and Japanese Patent Laid-Open Publication No. Hei 10-239216. Japanese Patent Laid-Open Publication No. Sho 63-38877 discloses a technique relating to a test on an internal combustion engine in a low-temperature test room but fails to disclose treatment for exhaust gas discharged from the internal combustion engine at the time the engine is tested. Japanese Patent Laid-Open Publication No. Hei 10-239216 merely discloses a technique relating to a fatigue test on an exhaust manifold that is used for an internal combustion engine, but fails to disclose a test on the internal combustion engine itself.

SUMMARY OF THE INVENTION

Accordingly, it is a primary objective of the present invention to provide an exhaust treatment apparatus capable of testing an internal combustion engine with high work efficiency.

To achieve the objective, the present invention provides an exhaust treatment apparatus which treats exhaust) discharged from an exhaust port of an internal combustion engine when testing the internal combustion engine, and comprises an exhaust inlet portion having an inlet port through which exhaust discharged from the exhaust port is introduced, and a displacement mechanism which displaces the exhaust inlet portion in such a way as to set the inlet port close to and away from the exhaust port.

BRIEF DESCRIPTION OF THE DRAWINGS

The features of the invention that are believed to be novel are set forth with particularity in the appended claims. The invention, together with the object and advantages thereof, may best be understood by reference to the following description of the presently preferred embodiments together with the accompanying drawings.

DETAILED DESCRIPTION OF THE PREFERRED EMBODIMENTS

The first embodiment of the invention is described below with reference to FIGS. 1 to 7. An exhaust treatment apparatus 1 according to this embodiment is constructed in such a way so as to cope with an internal combustion engine E which has cylinders laid out in a V shape.

Figure 1:
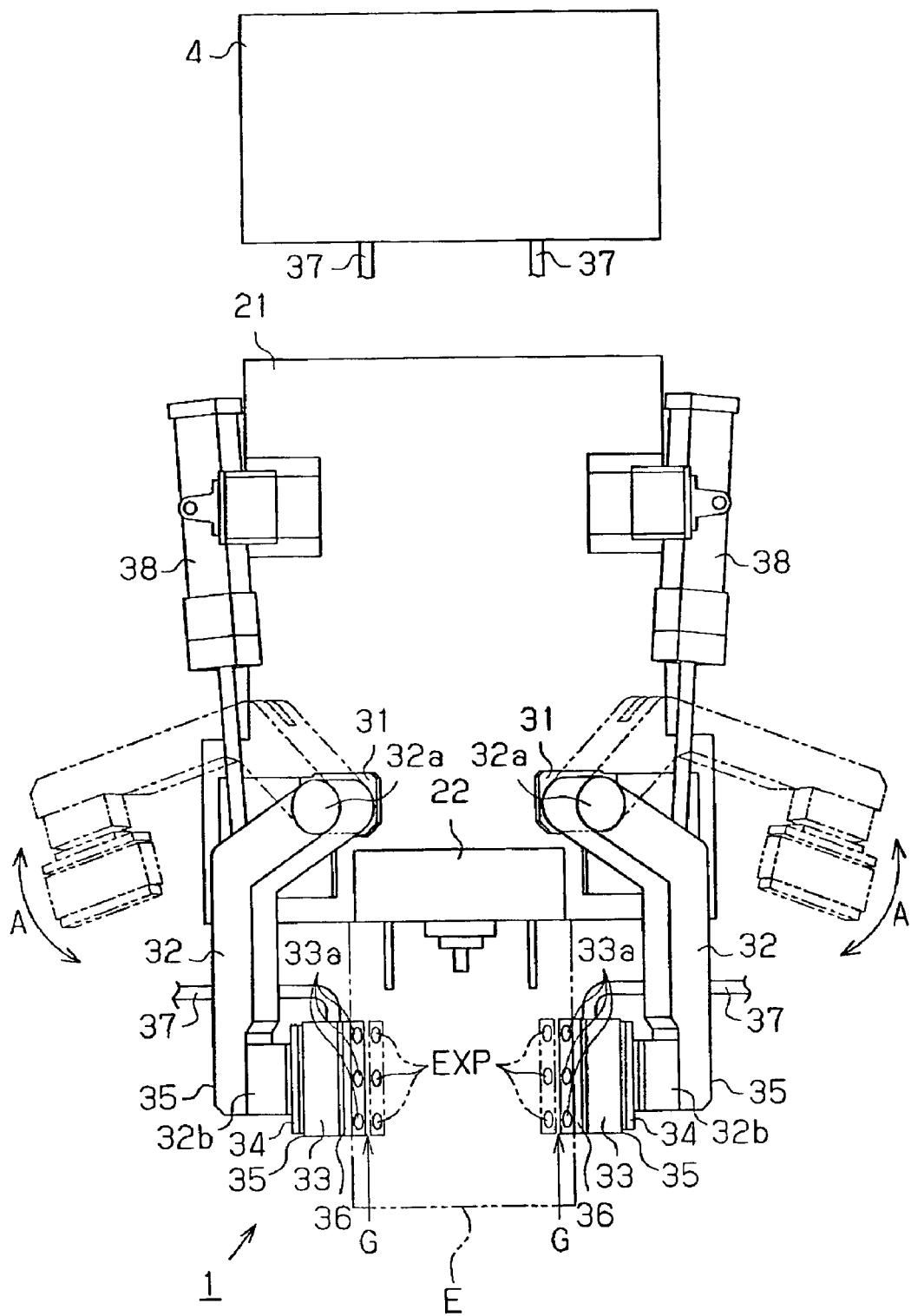
FIG. 1 is a plan view illustrating an exhaust treatment apparatus according to a first embodiment of the invention.
Figure 2:
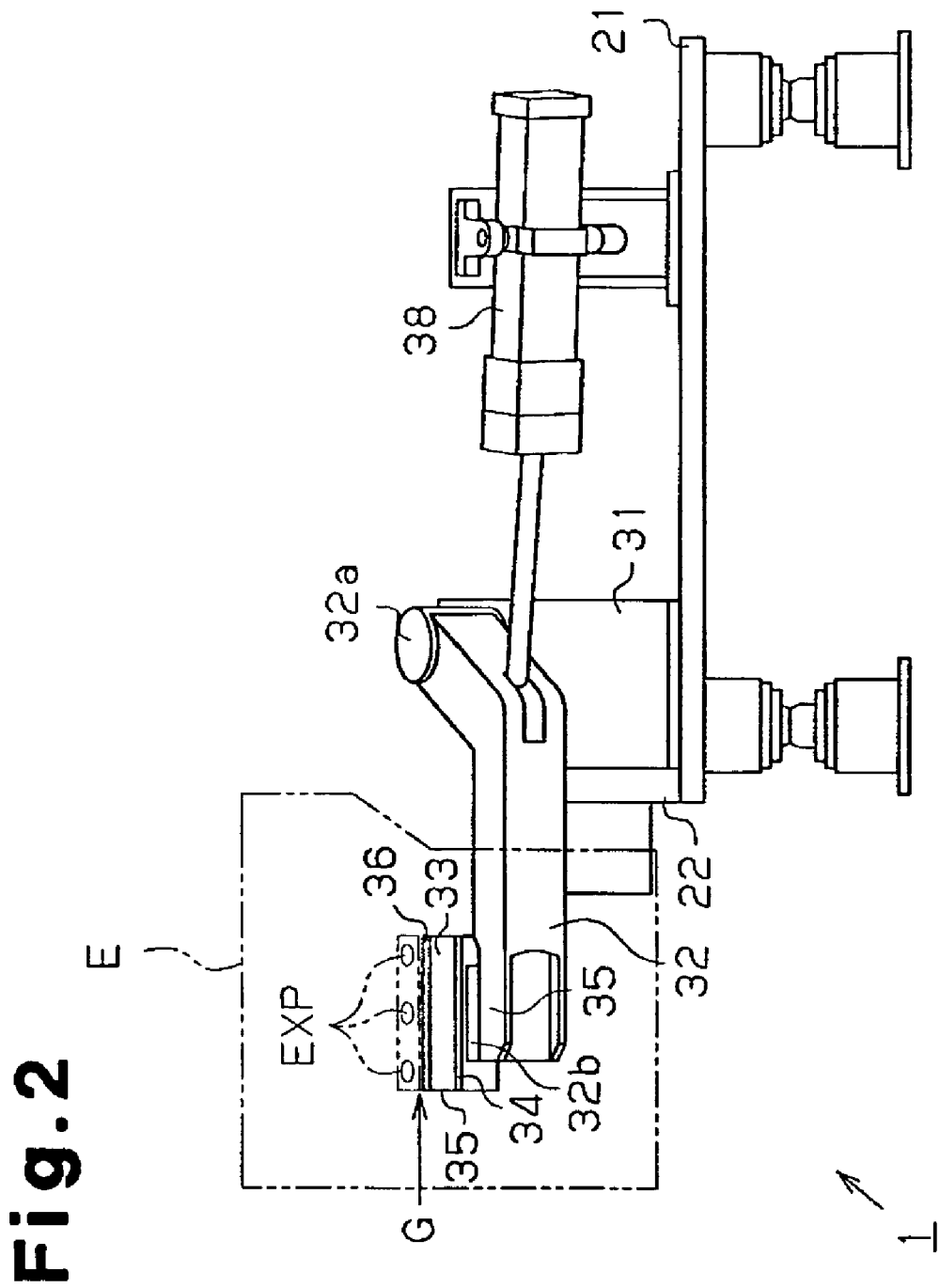
FIG. 2 is a side view of the exhaust treatment apparatus in FIG. 1.
Figure 3:
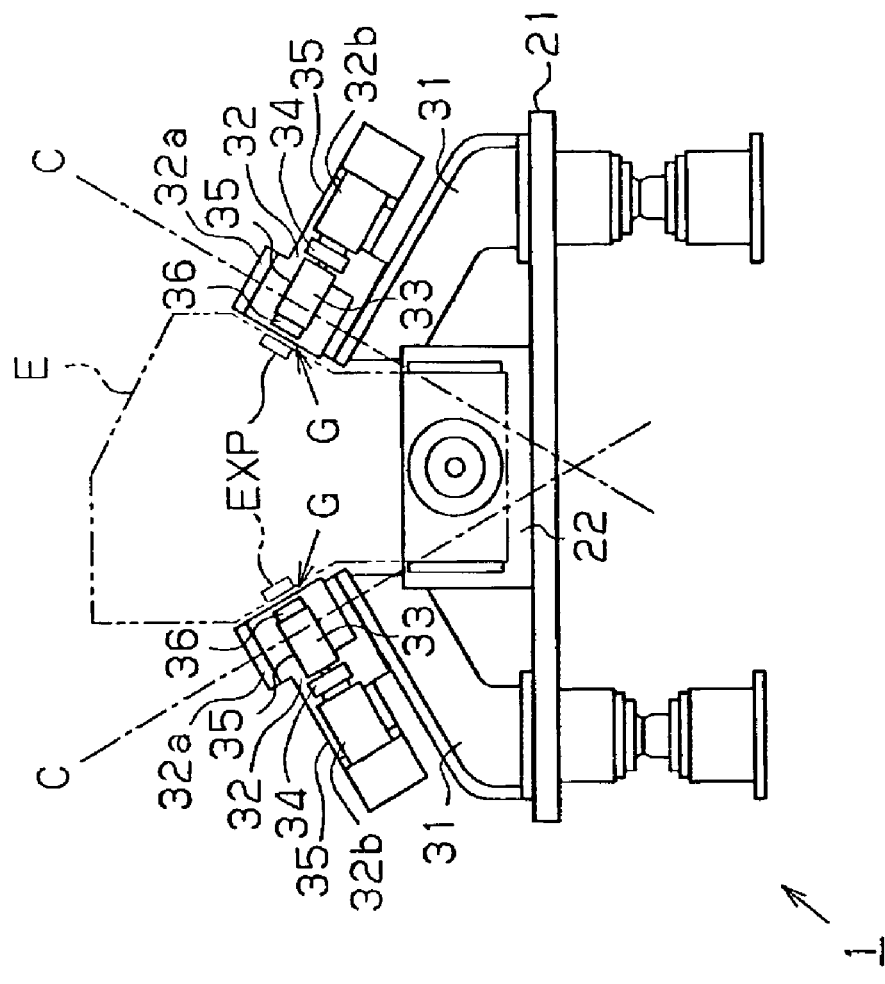
FIG. 3 is a front view of the exhaust treatment apparatus in FIG. 1.

Referring to FIGS. 1 to 3, the general structure of the exhaust treatment apparatus 1 is described first. At the time an internal combustion engine E is tested using the exhaust treatment apparatus 1, the internal combustion engine E is clamped by a clamp mechanism 22 provided on a test bed 21 and fixed at a position indicated by a two-dot chain line in FIGS. 1 to 3. The clamp mechanism 22 functions as a restriction mechanism which restricts the rocking of the internal combustion engine E when the internal combustion engine E runs.

Provided on the test bed 21 are a pair of arm mounting sections 31 to each of which an arm 32 is rotatably attached via an arm pivot portion 32a. The arm mounting section 31 is constructed in such a way that the center axis, C, of the arm pivot portion 32a has a predetermined inclination corresponding to the shape of the internal combustion engine E with respect to the test bed 21.

An exhaust inlet portion or a masking section 33, which is connected to the internal combustion engine E and into which the exhaust gas from the engine E is led, is provided at the distal end portion of each arm 32 or an arm distal end portion 32b. Each masking section 33 is coupled to the associated arm distal end portion 32b via a masking-section cylinder 34 comprised of a hydraulic cylinder. The masking section 33 can be set in close contact with the internal combustion engine E via the pressure applied on the masking section 33 by the cylinder 34.

Each masking section 33 is attachable to and detachable from the associated arm distal end portion 32b. Each of the arms 32 and the masking sections 33 is covered with a heat insulator 35.

Each arm 32 is coupled to an arm cylinder 38, comprised of a hydraulic cylinder and provided at the test bed 21. Each arm 32 is moved by the associated cylinder 38 in such a way as to draw an arcuate locus with the center axis C of the arm pivot portion 32a as a rotational axis.

Each arm 32 rotates in such a way that the arm distal end portion 32b moves close to and away from an associated exhaust port Exp of the internal combustion engine E. Specifically, each arm 32 rotates between a position indicated by a solid line in FIGS. 1 to 3 (position closest to the internal combustion engine E) and a position indicated by a two-dot chain line (position farthest from the internal combustion engine E) as indicated by the arrow A. Hereinafter, the position of the arm 32 closest to the internal combustion engine E is called a "test position" and the position of the arm 32 farthest from the internal combustion engine E is called a "standby position".

The test position and the standby position are set as follows. That is, the test position is set at the position where a predetermined gap G is provided between each of a plurality of inlet ports 33a provided at each masking section 33 and the associated exhaust port Exp of the internal combustion engine E. The standby position is set at the position where each arm 32 does not interfere with the carry-in/carry-out of the internal combustion engine E.

A plurality of inlet ports 33a provided at each masking section 33 respectively correspond to the plurality of exhaust ports Exp provided at one side of the internal combustion engine E. A masking plate 36 (seal member) formed of a fluorine-based rubber material is attached to an end face of each masking section 33 having those inlet ports 33a arranged in such a way as to surround the inlet ports 33a. At the time each masking section 33 is connected to the internal combustion engine E, the masking plate 36 adequately seals connected portions between the exhaust ports Exp and the associated inlet ports 33a.

The masking section 33 is connected to the internal combustion engine E in the following manner. As the masking section 33 is pressed toward the internal combustion engine E by the masking-section cylinder 34 with each arm 32 being at the test position, the predetermined gap G disappears, thus connecting the inlet ports 33a to the associated exhaust ports Exp.

The masking section 33 takes a floating structure. While being connected to the internal combustion engine E, the masking section 33 having the floating structure blocks transmission of vibration to the arm 32 from the internal combustion engine E. Further, the masking plate 36, which is resilient, absorbs the vibration of the internal combustion engine E in such a way as to suppress transmission of the vibration to the masking section 33.

The masking sections 33 are connected via flexible exhaust pipes 37 to an exhaust treatment section 4 which treats the exhaust gases discharged from the exhaust ports Exp of the internal combustion engine E. Therefore, the exhaust gas discharged from each exhaust port Exp flows inside the exhaust treatment apparatus 1 in the order of the associated inlet port 33a, the associated masking section 33, the associated exhaust pipe 37 and the exhaust treatment section 4. The exhaust treatment section 4 treats the exhaust gas from the internal combustion engine E by an appropriate known method.

In the present embodiment, the arms 32, the arm cylinders 38 and the masking-section cylinders 34 constitute a displacement mechanism and the masking-section cylinders 34 function as a pressing mechanism.

Next, the test mode of the internal combustion engine E by the exhaust treatment apparatus 1 is described with reference to FIGS. 4 to 7. The internal combustion engine E is tested in the following steps 1 to 8.

Figure 4:
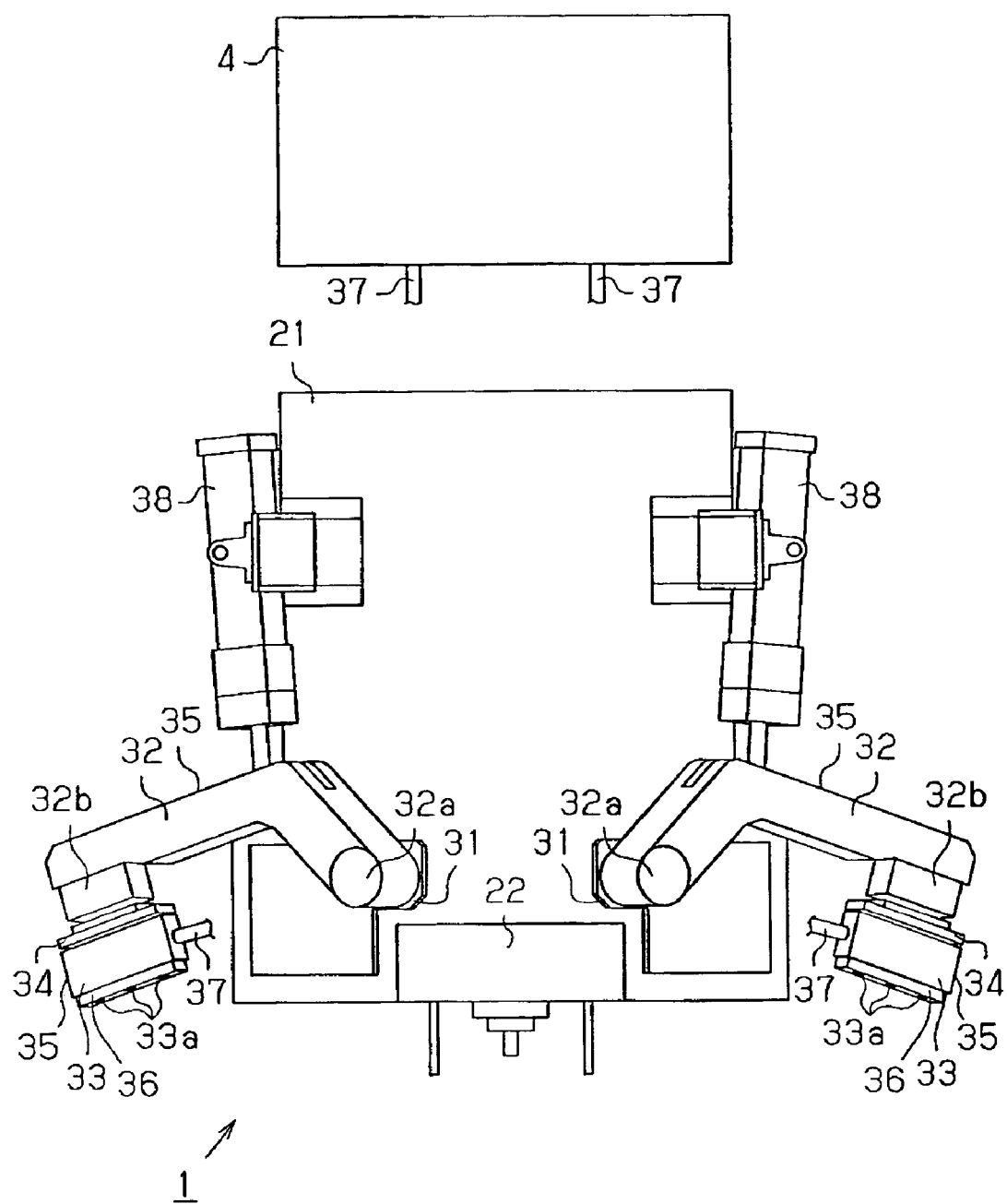
FIG. 4 is a plan view illustrating the operational mode of the exhaust treatment apparatus in FIG. 1.

Step 1: As shown in FIG. 4, both arms 32 are held at the standby position by the associated arm cylinders 38 before the internal combustion engine E is brought into the exhaust treatment apparatus 1.

Figure 5:
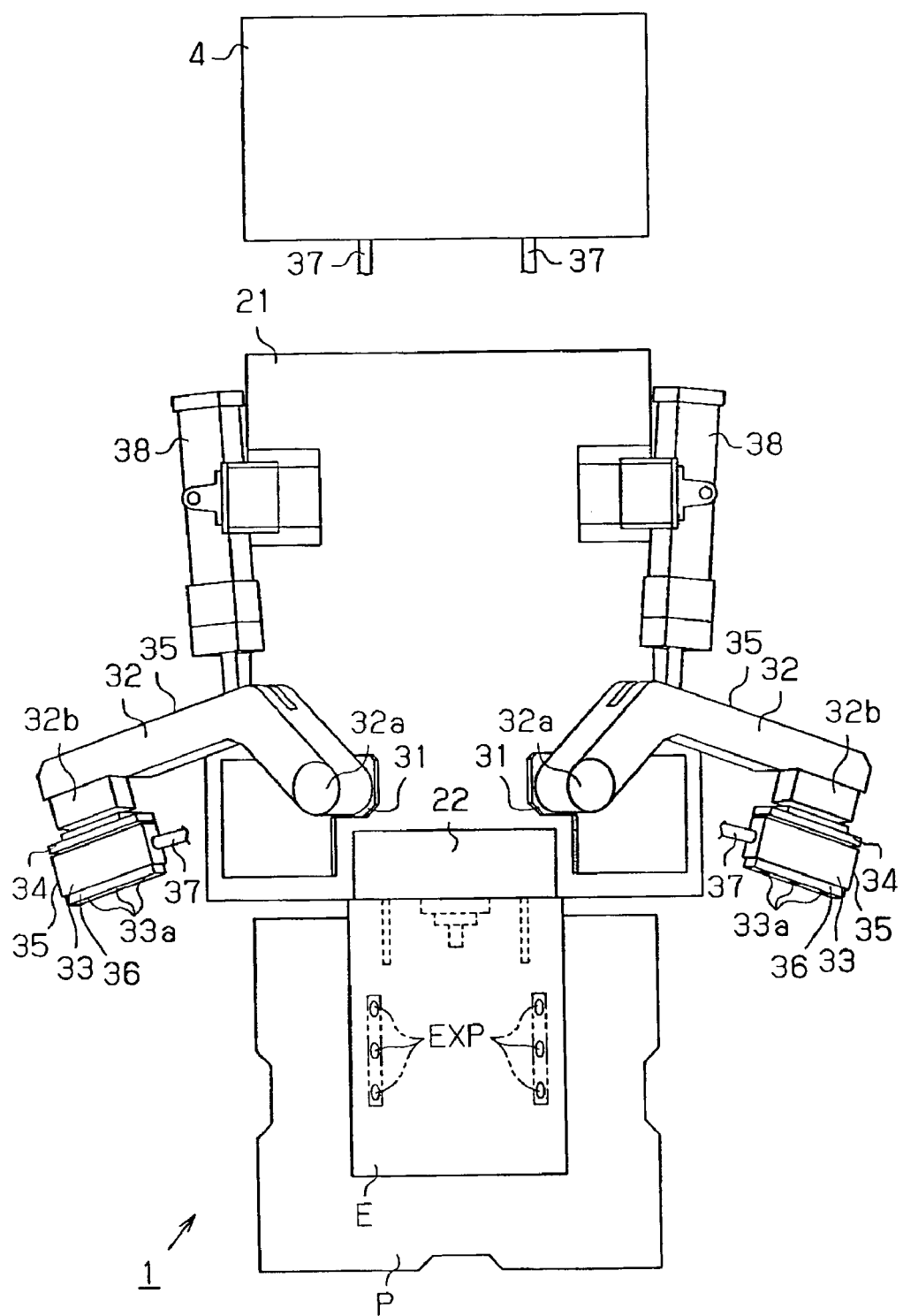
FIG. 5 is a plan view illustrating the operational mode of the exhaust treatment apparatus in FIG. 1.

Step 2: As shown in FIG. 5, the internal combustion engine E is carried in by a pallet P and the engine E is then clamped by the clamp mechanism 22.

Figure 6:
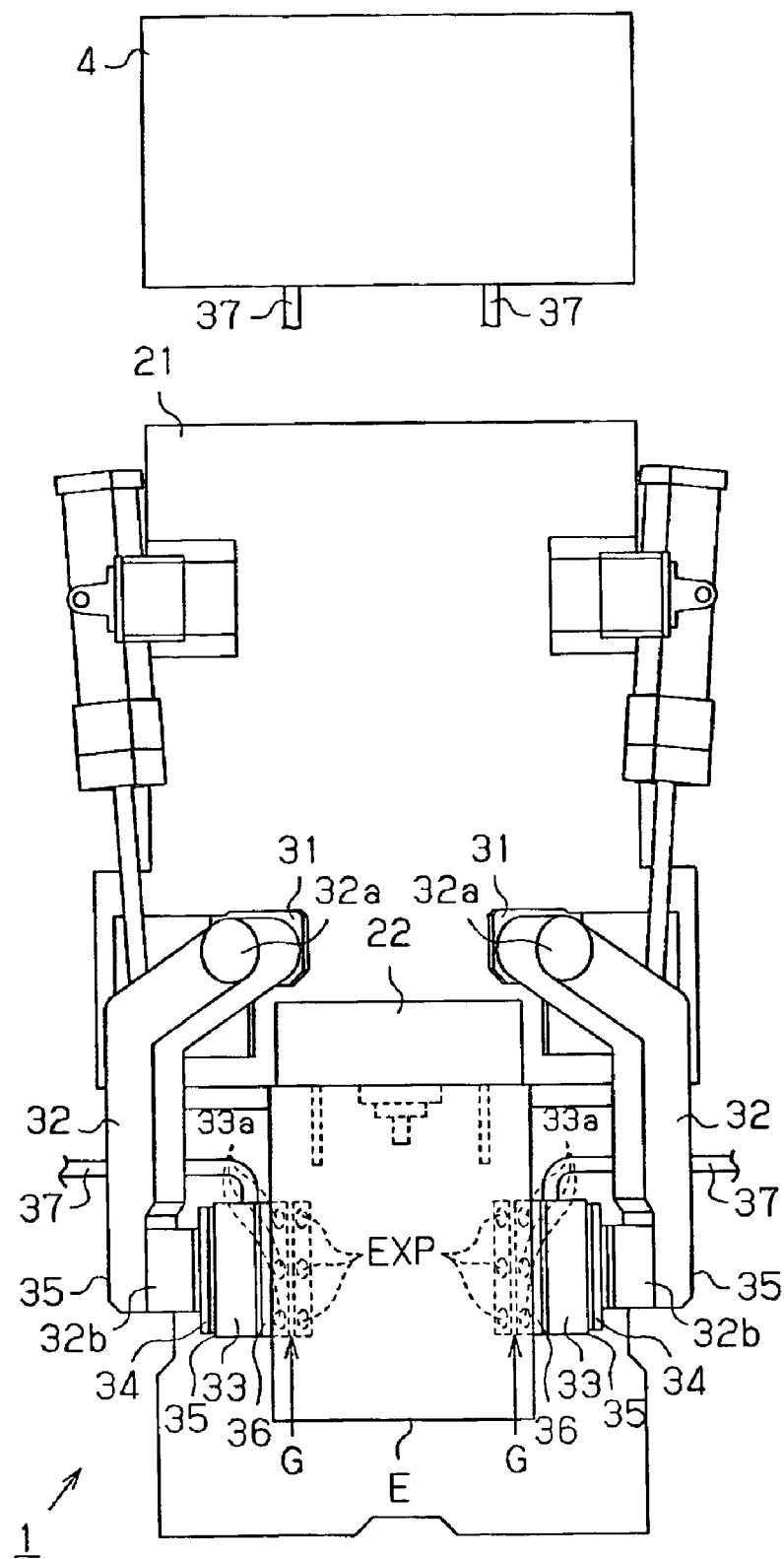
FIG. 6 is a plan view illustrating the operational mode of the exhaust treatment apparatus in FIG. 1.

Step 3: As shown in FIG. 6, the arms 32 are rotated to the test position by the associated arm cylinders 38 and are held at the test position. At this time, the inlet ports 33a of each masking section 33 face the associated exhaust ports Exp of the internal combustion engine E at the predetermined gap G.

Figure 7:
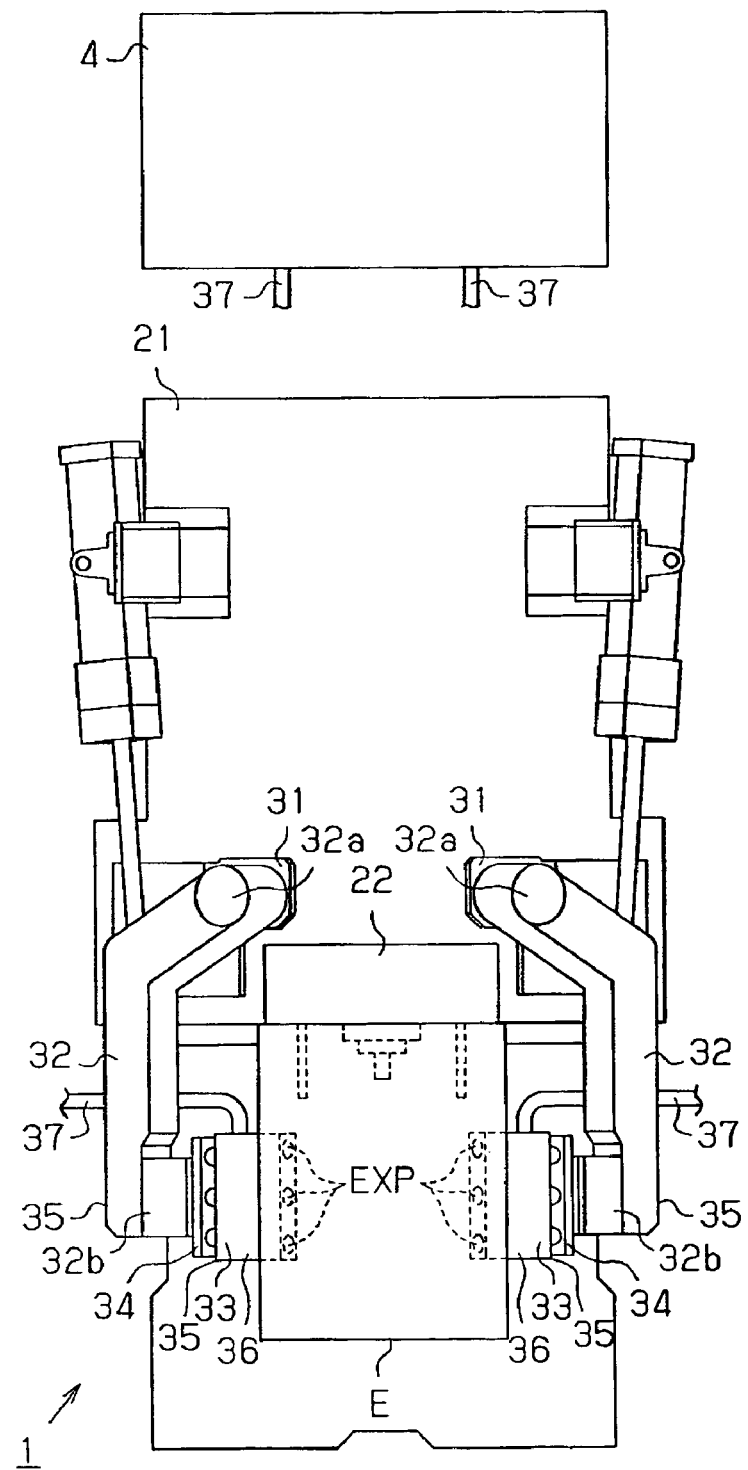
FIG. 7 is a plan view illustrating the operational mode of the exhaust treatment apparatus in FIG. 1.

Step 4: As shown in FIG. 7, the masking section 33 is pressed toward the internal combustion engine E by the associated masking-section cylinder 34 and the inlet ports 33a of the masking section 33 are connected to the associated exhaust ports Exp.

Step 5: The internal combustion engine E is started in the state shown in FIG. 7 and a test is conducted by an inspector as to whether or not there are problems with the engine E including abnormal noise, defective assemblage and oil leakage. At this time, the exhaust gas produced by the running of the internal combustion engine E flows in the order of the exhaust ports Exp, the inlet ports 33a, the masking sections 33, the exhaust pipes 37 and the exhaust treatment section 4 and is treated in the exhaust treatment section 4.

Step 6: After the test on the internal combustion engine E is finished, the masking sections 33 are separated from the internal combustion engine E by the associated masking-section cylinders 34 by disconnecting the inlet ports 33a from the exhaust ports Exp, as shown in FIG. 6.

Step 7: As shown in FIG. 5, the arms 32 are pulled back to the standby position from the test position by the associated arm cylinders 38 and held at the standby position.

Step 8: As shown in FIG. 4, the clamping of the internal combustion engine E by the clamp mechanism 22 is released and the internal combustion engine E is then carried out on the pallet P.

After the test on one internal combustion engine is conducted via the steps 1 to 8, another internal combustion engine is carried in and the same procedures as in the steps 1 to 8 are repeated.

As apparent from the above, this embodiment has the following advantages.

(1) The arms 32, the arm cylinders 38 and the masking-section cylinders 34 which constitute the displacement mechanism function to connect the masking sections 33 to the internal combustion engine E. At the time the internal combustion engine E is tested, this embodiment eliminates the need for an exhaust manifold that is needed in the prior art. This can lead to reduction in the cost needed for testing the internal combustion engine E. The use of the exhaust treatment apparatus 1 according to this embodiment in testing the internal combustion engine E can ensure preparation of the test without requiring manual work by a worker. Unlike in the prior art, the embodiment does not require work for attachment and detachment of an exhaust manifold with respect to an internal combustion engine. Therefore, the embodiment can test the internal combustion engine E with high efficiency.

(2) The masking-section cylinder 34 presses the associated masking section 33 toward the internal combustion engine E. Accordingly, the inlet port 33a of the masking section 33 is adequately placed in close contact with the associated exhaust port Exp of the internal combustion engine E, thus adequately suppressing leakage of the exhaust gas to the outside.

(3) The arm 32 and the masking section 33 are covered with the heat insulator 35. This suppresses a rise in the surface temperatures of the arm 32 and the masking section 33 and heat radiation from the arm 32 and the masking section 33. At the time the internal combustion engine E is tested, therefore, an inspector can properly view the status of the internal combustion engine E at a position relatively close to the engine E.

(4) The arm 32 is moved by the associated cylinder 38 in such a way as to draw an arcuate locus with the arm pivot portions 32a as the center axis. This can permit an inspector to come closer to the internal combustion engine E, thereby more suitably guaranteeing visibility for the inspector with respect to the internal combustion engine E.

(5) Conventionally, at the time of testing an internal combustion engine, an exhaust manifold equipped on a vehicle or an exhaust manifold for a test is connected to the internal combustion engine. Because such an exhaust manifold generally has a complex shape, the visibility of that side portion of the internal combustion engine where the exhaust manifold is connected at the time of testing the engine is not secured sufficiently. As the masking section 33 is designed to be more compact than the exhaust manifold and is connected to an internal combustion engine according to the exhaust treatment apparatus 1 of this embodiment, the visibility for a worker can be guaranteed suitably.

(6) While being connected to the internal combustion engine E, the masking section 33 having a floating structure blocks transmission of vibration to the arm 32 from the engine E. At least that portion of the masking section 33 which is connected to the internal combustion engine E (the portion to which the masking plate 36 is attached) is floating with respect to the remaining portion, and can therefore move together with the internal combustion engine E in response to the vibration of the engine E during engine running. Even while the internal combustion engine E is running under a test, therefore, the connection between the engine E and the masking section 33 is maintained properly, thus advantageously suppressing leakage of the exhaust gas.

(7) The masking plate 36 formed of a fluorine-based rubber material is provided around the inlet ports 33a of each masking section 33. As the connected portions between the inlet ports 33a and the exhaust ports Exp are sealed with the masking plate 36 formed of a fluorine-based rubber material having high heat resistance, leakage of the exhaust gas is suppressed properly. In addition, the synergism of this advantage with the advantage described in (6) can suppress the transmission of vibration to the arm 32 from the internal combustion engine E more properly.

(8) The masking sections 33 are connected via the flexible exhaust pipes 37 to the exhaust treatment section 4. This can increase the degree of freedom in designing the exhaust treatment apparatus 1 including the shape and layout and the like of the exhaust pipes 37.

(9) The masking section 33 is attachable to and detachable from the associated arm distal end portion 32b. Therefore, the masking section 33 can be replaced with a proper one in accordance with the shape of the internal combustion engine. This can increase the versatility of the exhaust treatment apparatus 1.

(10) The arms 32 and the arm cylinders 38 are provided on the test bed 21. As a result, the overall size of the exhaust treatment apparatus 1 becomes relatively small.

(11) The internal combustion engine E is clamped by the clamp mechanism 22 provided on the test bed 21. At the time of testing the internal combustion engine E, therefore, the engine E can be kept stable.

(12) At the time the inlet ports 33a of the masking section 33 are connected to the exhaust ports Exp of the internal combustion engine E, the arm 32 is moved to the test position and the masking section 33 is then pressed toward the internal combustion engine E by the masking-section cylinder 34. This suppresses shocks generated when the masking section 33 is connected to the internal combustion engine E to advantageously avoid damage to bolts and the like provided around the exhaust port Exp, as compared with a case where the masking section 33 is connected to the engine E merely by moving the arm 32.

(13) The masking sections 33 of the pair of arms 32 are connected to the internal combustion engine E in such a way as to grab the internal combustion engine E. This can permit the internal combustion engine E to be maintained stably at the time of testing the engine E.

Figure 8:
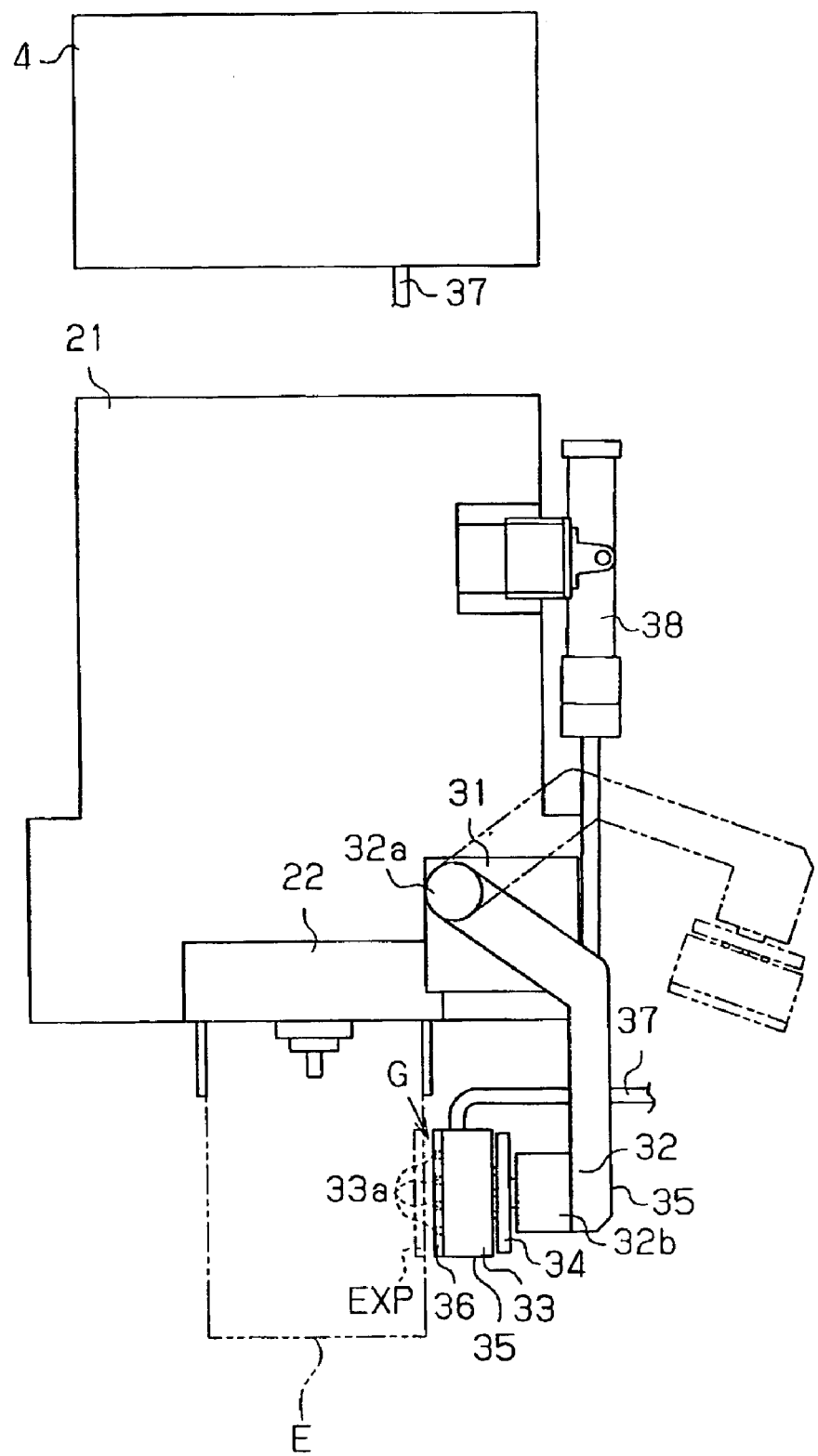
FIG. 8 is a plan view illustrating an exhaust treatment apparatus according to a second embodiment of the invention.
Figure 9:
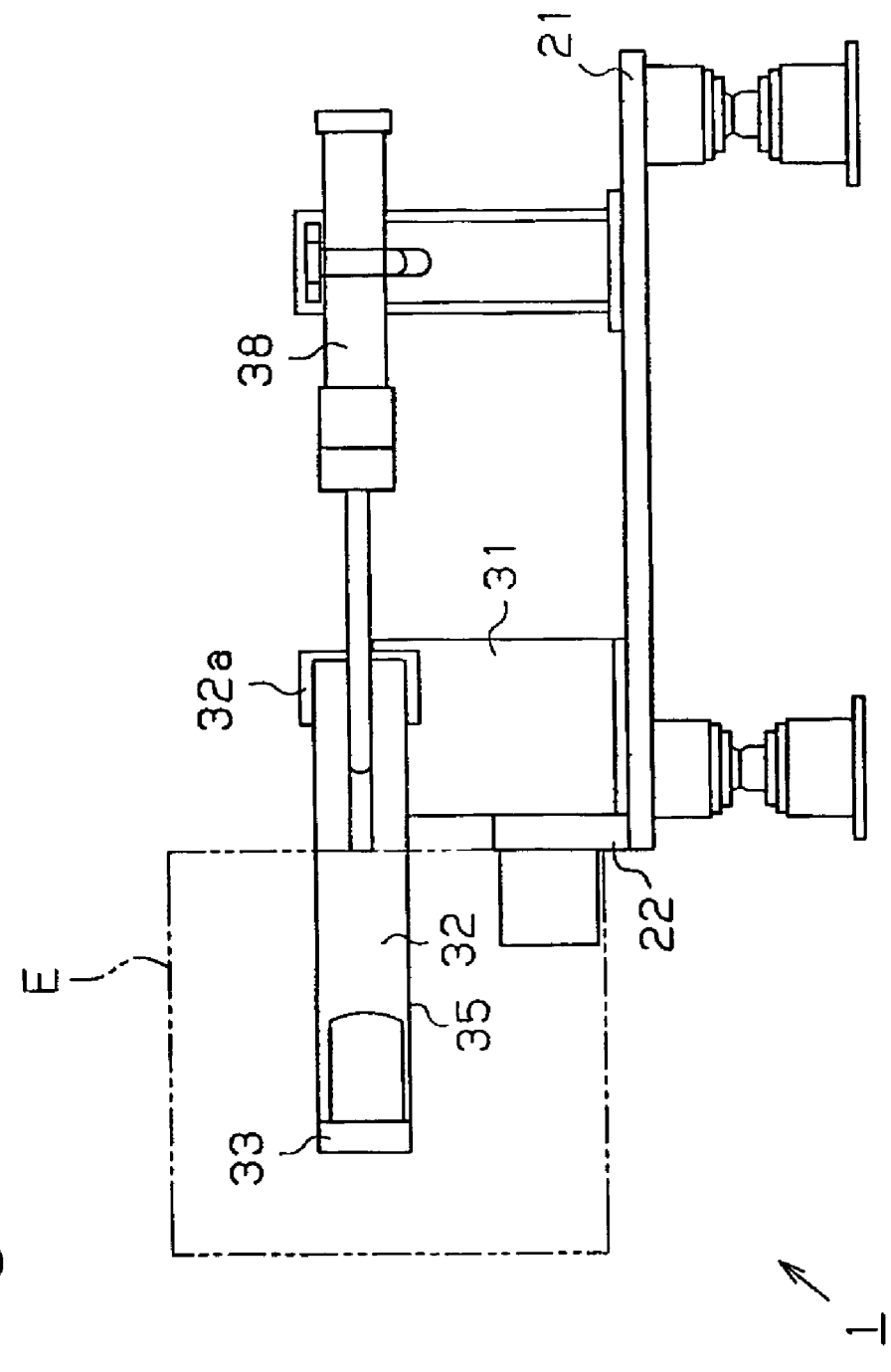
FIG. 9 is a side view of the exhaust treatment apparatus in FIG. 8.
Figure 10:
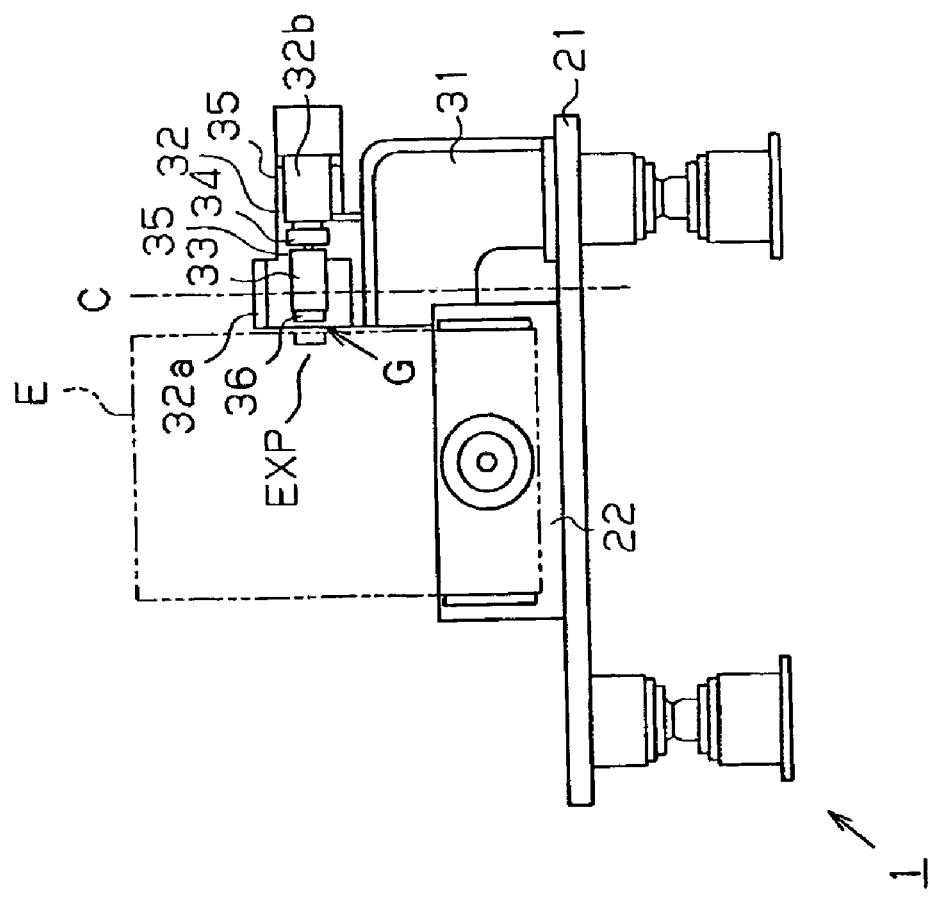
FIG. 10 is a front view of the exhaust treatment apparatus in FIG. 8.

Referring now to FIGS. 8 to 10, the second embodiment of the present invention is described, centering on the differences from the first embodiment in FIGS. 1 to 7. The exhaust treatment apparatus 1 according to the second embodiment is constructed in such a way so as to cope with an internal combustion engine E having inline cylinders.

The exhaust treatment apparatus 1 of this embodiment differs from that of the first embodiment in FIGS. 1 to 7 in the following points. That is, the arm mounting section 31 is constructed in such a way that the center axis C of the arm pivot portion 32a intersects the test bed 21 approximately perpendicularly in accordance with the shape of the internal combustion engine E, as shown in FIGS. 8 to 10.

Further, two arms 32 are provided on the test bed 21 in the first embodiment in FIGS. 1 to 7, whereas the arm 32 is provided only on that side which corresponds to the exhaust ports Exp of the internal combustion engine E in the second embodiment. The arm 32, like the arm 32 in the first embodiment in FIGS. 1 to 7, has the masking section 33 at the arm distal end portion 32b and the masking section 33 is coupled to the arm distal end portion 32b via the masking-section cylinder 34.

In the exhaust treatment apparatus 1 of this embodiment, the internal combustion engine E is also tested according to the procedures of steps 1 to 8 described in the foregoing description of the first embodiment in FIGS. 1 to 7. The second embodiment therefore has advantages similar to the above-described advantages 1 to 12 of the first embodiment in FIGS. 1 to 7.

Although the arm 32 is provided only on that side which corresponds to the exhaust ports Exp of the internal combustion engine E in FIGS. 8 to 10, the structure may be modified as follows. Like the structure of the first embodiment in FIGS. 1 to 7, another arm facing the arm 32 in FIGS. 8 to 10 may be provided with an internal combustion engine E in between the two arms so that the internal combustion engine E is held by both arms. This modification can keep the internal combustion engine E more stable as compared with the case where only a single arm is provided. It is of course unnecessary to provide an inlet port on or connect an exhaust pipe to that masking section which is provided on the arm that does not correspond to the exhaust ports Exp of the internal combustion engine E.

The third embodiment of the present invention is described below with reference to FIGS. 11 to 15. The exhaust treatment apparatus 1 according to this embodiment is constructed in such a way so as to cope with an internal combustion engine E that has cylinders laid out in a V shape. The same reference symbols are given to those members which have the same functions as the corresponding members of the first embodiment in FIGS. 1 to 7.

Figure 11:
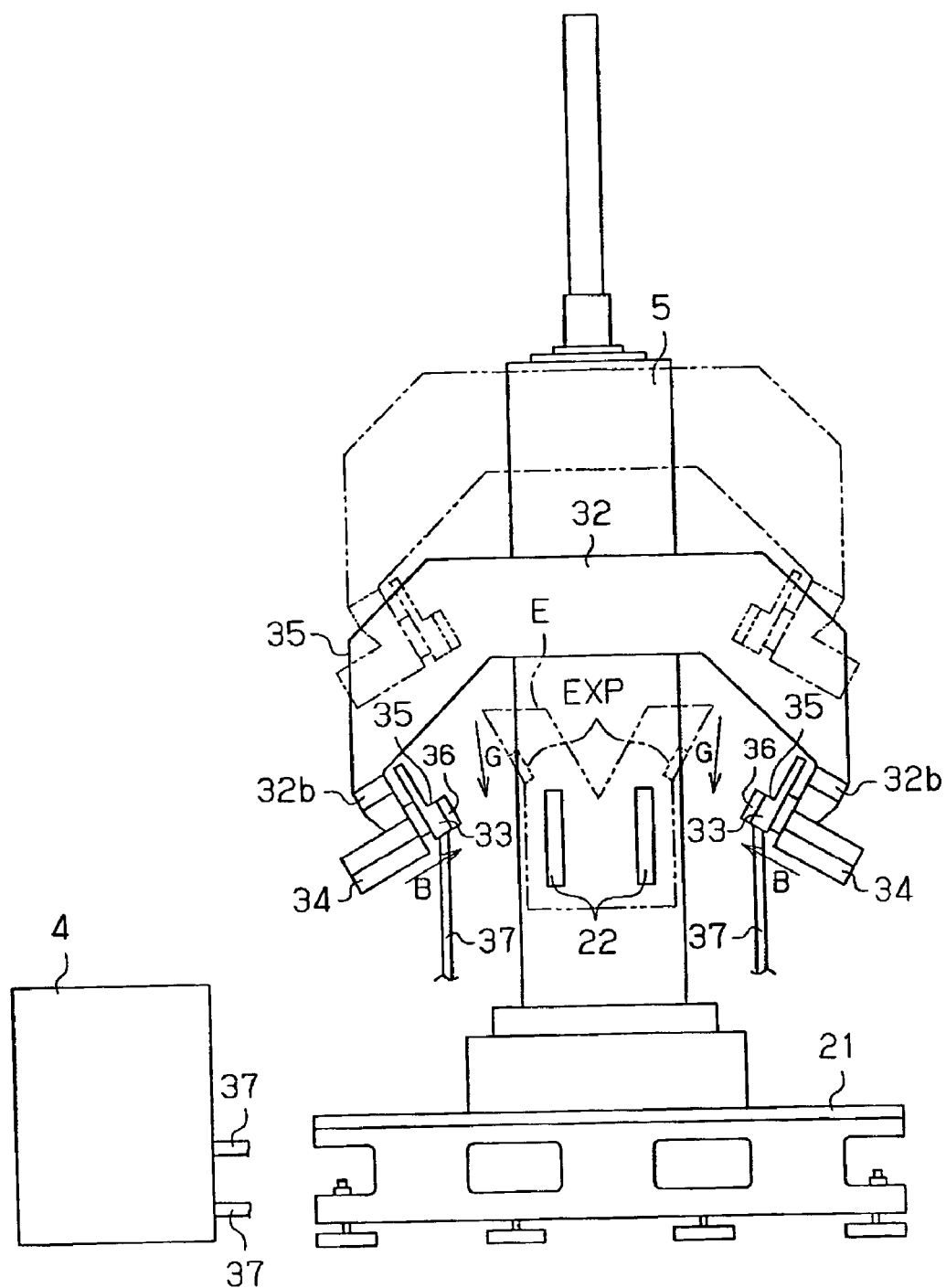
FIG. 11 is a front view illustrating an exhaust treatment apparatus according to a third embodiment of the invention.

The general structure of the apparatus 1 is discussed first with reference to FIG. 11. At the time the internal combustion engine E is tested using the exhaust treatment apparatus 1, the internal combustion engine E is clamped by the clamp mechanism 22 provided on the test bed 21 and is fixed at a position indicated by a two-dot chain line in FIG. 11.

A slide mechanism 5 is provided upright on the test bed 21 and a gate-shaped arm 32 is attached to the slide mechanism 5. The slide mechanism 5 has an actuator to lift the arm 32 up and down. The masking sections 33 that function as exhaust inlet portions are respectively provided at the two distal end portions of the gate-shaped arm 32 or both arm distal end portions 32b. Each masking section 33 is coupled to the associated arm distal end portion 32b via the associated masking-section cylinder 34. Each masking section 33 is attachable to and detachable from the associated arm distal end portion 32b. Each of the arm 32 and both masking sections 33 is covered with the heat insulator 35.

The arm 32 is moved up and down with respect to the test bed 21 by the slide mechanism 5. The arm 32 is lifted up and down in such a way that both arm distal end portions 32b move close to and away from the associated exhaust ports Exp of the internal combustion engine E. Specifically, the arm 32 is lifted up and down between a position indicated by a solid line in FIG. 11 (position closest to the internal combustion engine E9) and a position indicated by a two-dot chain line (position farthest from the internal combustion engine E). Hereinafter, the position of the arm 32 closest to the internal combustion engine E is called a "test position" and the position of the arm 32 farthest from the internal combustion engine E is called a "standby position".

The test position and the standby position are set in the same way as those in the first embodiment in FIGS. 1 to 7. That is, the test position is set at the position where a predetermined gap G is provided between each of a plurality of inlet ports 33a provided at each masking section 33 and the associated exhaust port Exp of the internal combustion engine E. The standby position is set at the position where each arm 32 does not interfere with the carry-in/carry-out of the internal combustion engine E.

A masking plate 36 similar to the one in the first embodiment in FIGS. 1 to 7 is attached to each masking section 33. As the masking section 33 is pressed toward the internal combustion engine E (the direction of the arrow B in FIG. 11) by the masking-section cylinder 34 with the arm 32 being at the test position, the predetermined gap G disappears, with the result that the inlet ports 33a are connected to the associated exhaust ports Exp. As in the first embodiment in FIGS. 1 to 7, the masking section 33 has a floating structure and is connected to the exhaust treatment section 4 via the flexible exhaust pipe 37.

In this embodiment, the arm 32, the masking-section cylinders 34 and the slide mechanism 5 constitute the displacement mechanism and the masking-section cylinders 34 function as the pressing mechanism.

Referring to FIGS. 12 to 15, the test mode of the internal combustion engine E by the exhaust treatment apparatus 1 is discussed. The internal combustion engine E is tested in the following steps 1 to 8.

Figure 12:
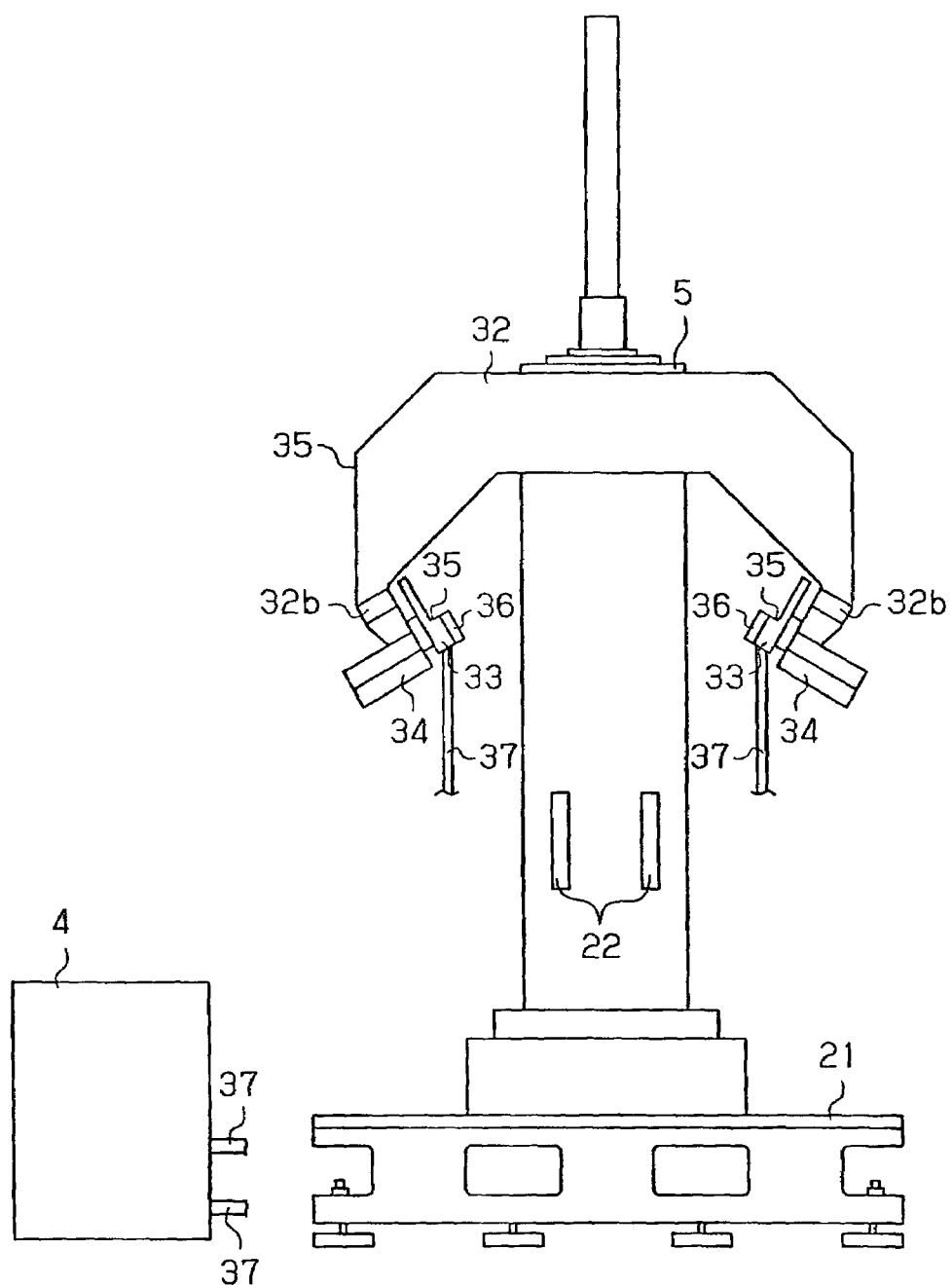
FIG. 12 is a front view illustrating the operational mode of the exhaust treatment apparatus in FIG. 11.

Step 1: As shown in FIG. 12, the arm 32 is held at the standby position by the slide mechanism 5 before the internal combustion engine E is carried into the exhaust treatment apparatus 1.

Figure 13:
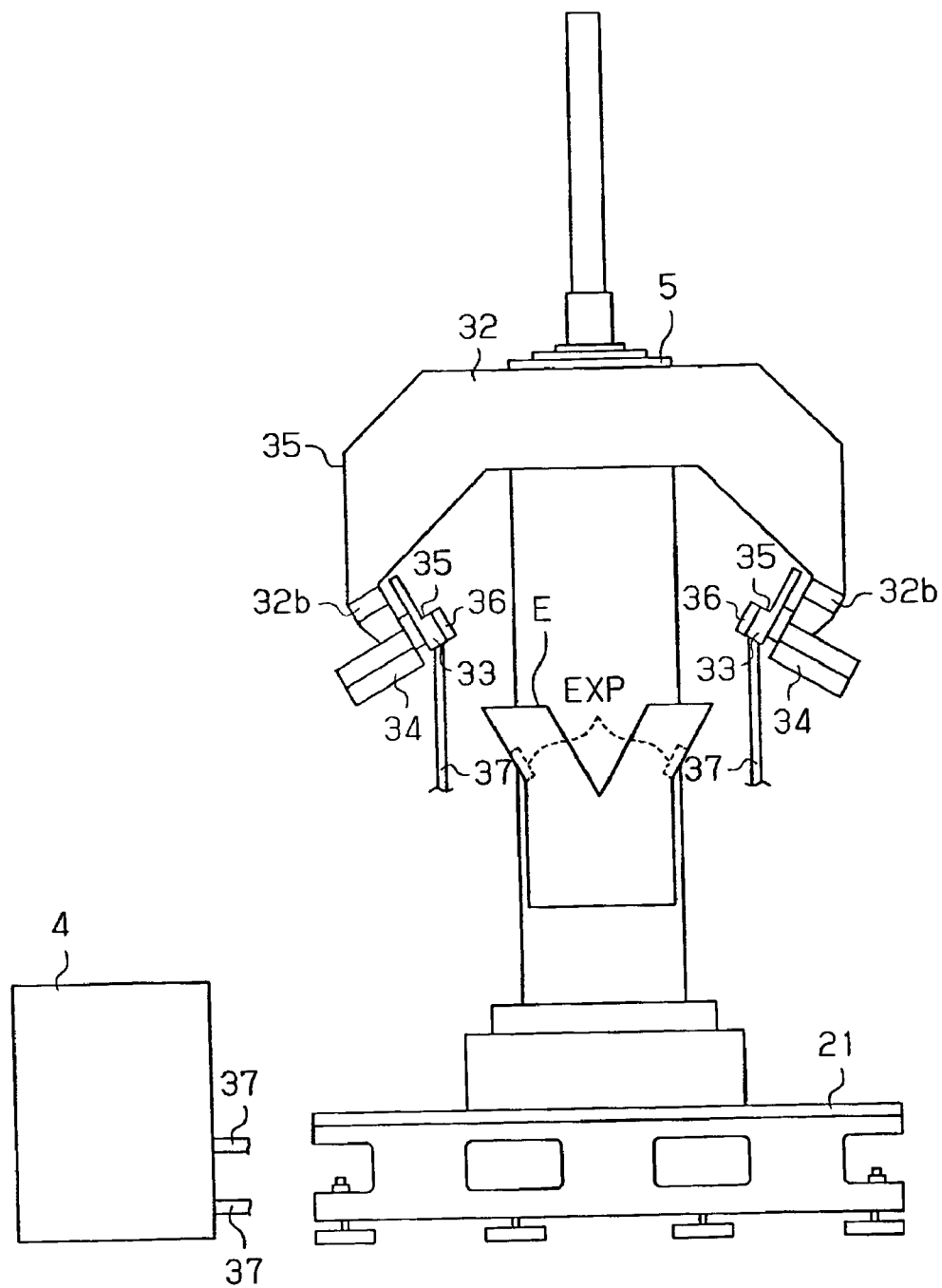
FIG. 13 is a front view illustrating the operational mode of the exhaust treatment apparatus in FIG. 11.

Step 2: As shown in FIG. 13, the internal combustion engine E is carried in by a predetermined device and the engine E is then clamped by the clamp mechanism 22.

Figure 14:
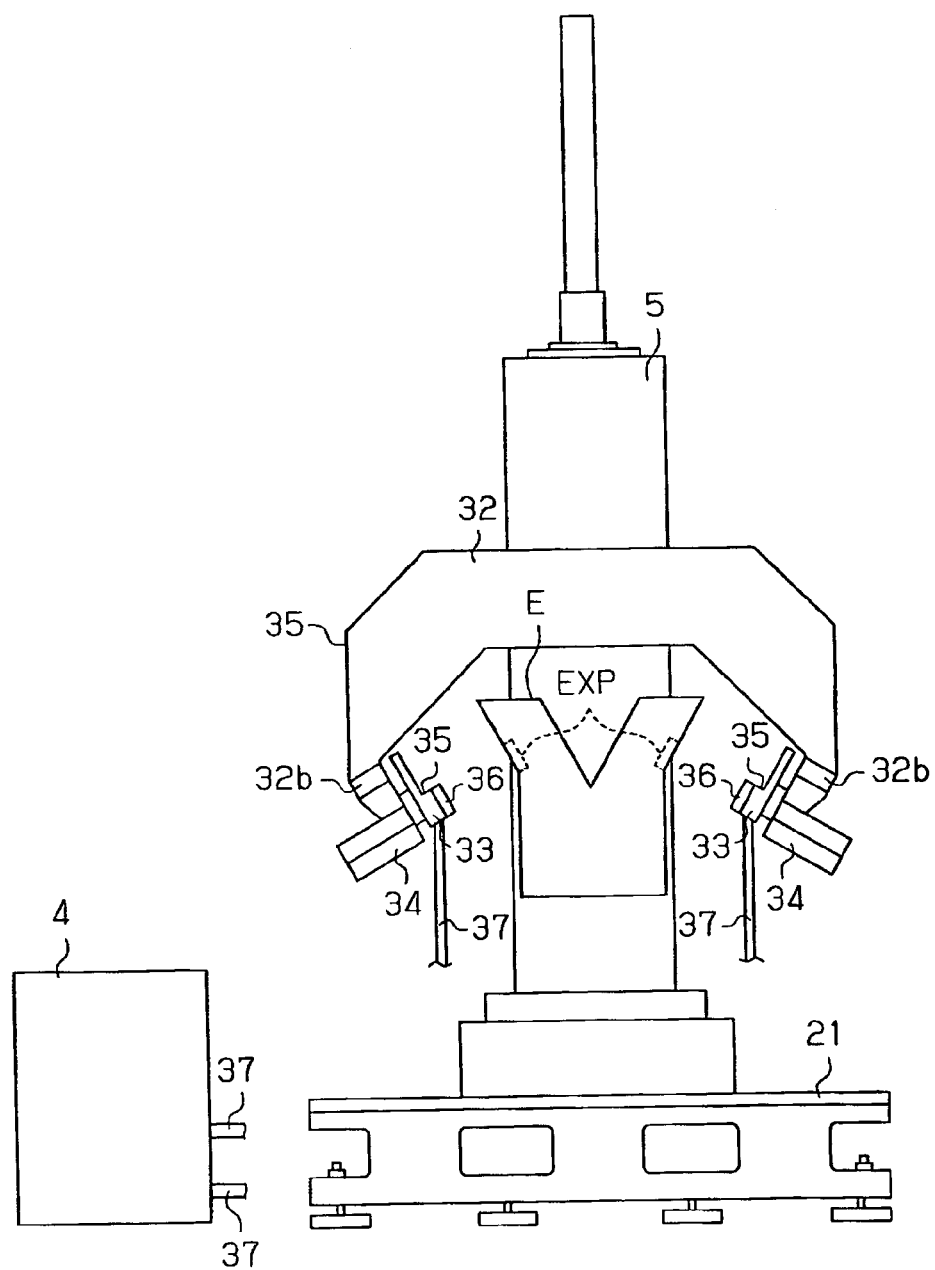
FIG. 14 is a front view illustrating the operational mode of the exhaust treatment apparatus in FIG. 11.

Step 3: As shown in FIG. 14, the arm 32 is moved to the test position by the slide mechanism 5 and held at the test position. At this time, the inlet ports 33a of each masking section 33 face the associated exhaust ports Exp of the internal combustion engine E at the predetermined gap G.

Figure 15:
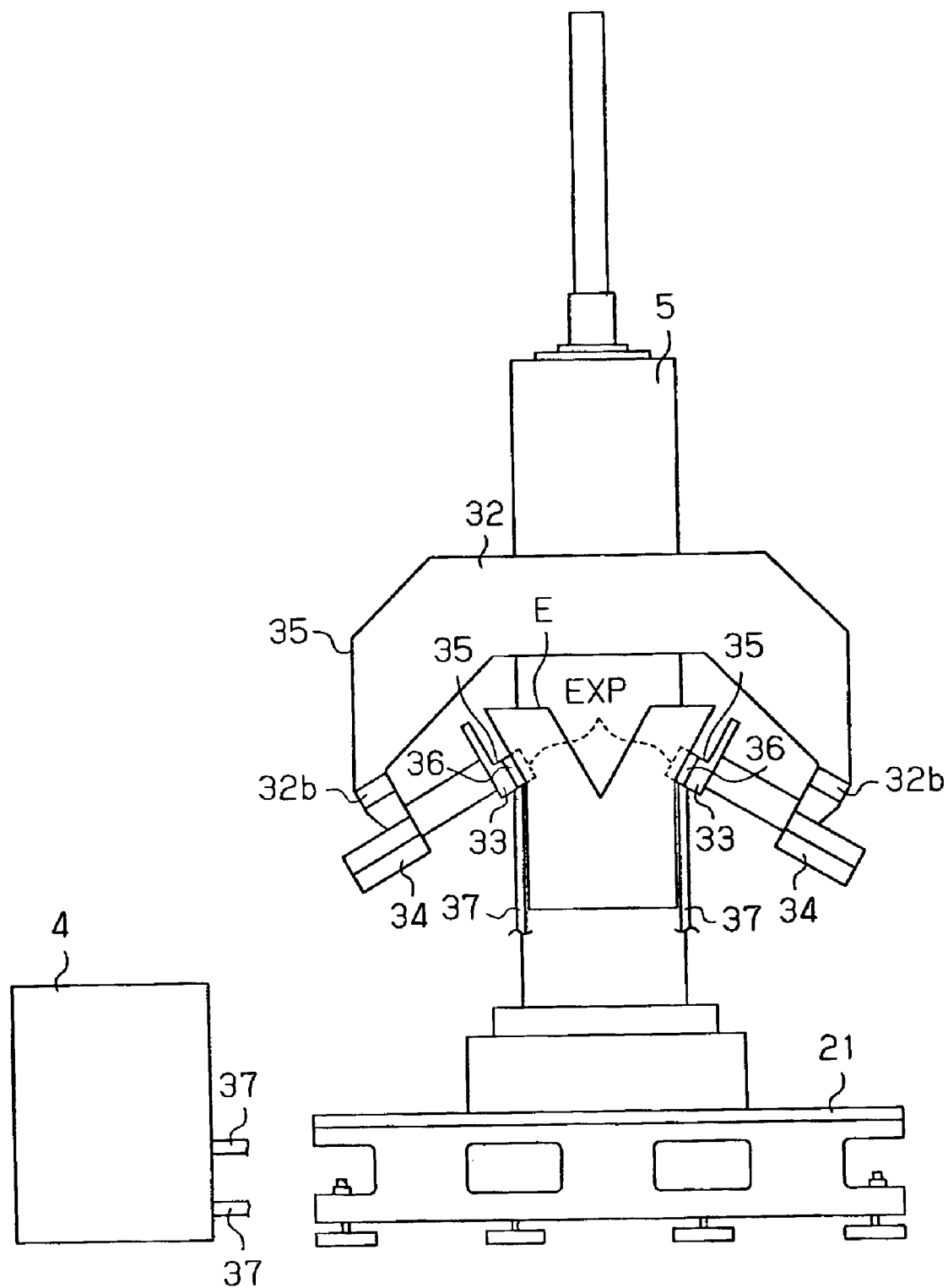
FIG. 15 is a front view illustrating the operational mode of the exhaust treatment apparatus in FIG. 11.

Step 4: As shown in FIG. 15, the masking section 33 is pressed toward the internal combustion engine E by the associated masking-section cylinder 34 so that the inlet ports 33a are connected to the associated exhaust ports Exp.

Step 5: The internal combustion engine E is started in the state shown in FIG. 15 and a test is conducted by an inspector as to whether or not there are problems with the engine E including abnormal noise, defective assemblage and oil leakage. At this time, the exhaust gas produced by the running of the internal combustion engine E flows in the order of the exhaust ports Exp, the inlet ports 33a, the masking sections 33, the exhaust pipes 37 and the exhaust treatment section 4 and is treated in the exhaust treatment section 4.

Step 6: After the test on the internal combustion engine E is finished, the masking sections 33 are separated from the internal combustion engine E by the associated masking-section cylinders 34, by disconnecting the inlet ports 33a from the exhaust ports Exp, as shown in FIG. 14.

Step 7: As shown in FIG. 13, the arm 32 is pulled back to the standby position from the test position by the slide mechanism 5 and held at the standby position.

Step 8: As shown in FIG. 12, the clamping of the internal combustion engine E by the clamp mechanism 22 is released and the internal combustion engine E is then carried out by the predetermined device.

After the test on one internal combustion engine is conducted through the steps 1 to 8, another internal combustion engine is carried in and the same procedures in the steps 1 to 8 are repeated.

The third embodiment discussed above in detail has advantages similar to the above-described advantages 1 to 13 of the first embodiment in FIGS. 1 to 7. Particularly, as the slide mechanism 5 which supports the arm 32 is provided upright on the test bed 21, the mounting area for the exhaust treatment apparatus 1 can be small.

The individual embodiments can be modified as follows.

In the first and second embodiments, the arm 32 and the arm cylinder 38 may be provided separate from the test bed 21. In the third embodiment, the slide mechanism 5 may be provided separate from the test bed 21. In those cases, the test bed 21 may be omitted. In a case where the test bed 21 is not provided, however, it is desirable to clamp an internal combustion engine and restrict the engine by an adequate clamp mechanism used in place of the clamp mechanism 22 on the test bed 21.

In the first and second embodiments, the arm 32 may be driven by an actuator other than a hydraulic cylinder. In the third embodiment, a hydraulic cylinder or various other kinds of actuators can be adapted too as an arm actuator provided on the slide mechanism 5. Further, the masking-section cylinder 34 in the first to third embodiments may be changed to an actuator other than a hydraulic cylinder.

In the first and second embodiments, the masking-section cylinder 34 may be omitted. In this case, the masking section 33 is connected to an internal combustion engine E only by the movement of the arm 32 done by the arm cylinder 38. That is, the arm 32 and the arm cylinder 38 alone constitute the displacement mechanism from which the masking-section cylinder 34 is excluded.

In the first and second embodiments, the masking-section cylinder 34 may be excluded from the components of the displacement mechanism and may function only as the pressing mechanism. That is, the masking section 33 may be connected to an internal combustion engine E only by the movement of the arm 32 done by the arm cylinder 38 and may then be pressed toward the internal combustion engine E by the masking-section cylinder 34.

In the first to third embodiments, the masking section 33 may be attached to the arm distal end portion 32b in an undetachable manner or the masking section 33 may be formed integral with the arm distal end portion 32b.

In the first to third embodiments, the heat insulator 35 which covers the arm 32 and masking section 33 may be omitted.

In the first to third embodiments, the masking section 33 may not take a floating structure.

In the first to third embodiments, the masking plate 36 may be formed of a material other than a fluorine-based rubber material. It is particularly preferable that the masking plate 36 be formed of a resilient material having heat resistance. The masking plate 36 may be omitted.

In the first to third embodiments, the exhaust pipe 37 may be constructed in such a way as to pass through the arm 32.

In the first to third embodiments, in place of the masking-section cylinder 34, a pressing mechanism for pressing the masking section 33 may be provided separate from the arm 32.

The exhaust treatment apparatus according to the invention is not limited to the use in the case where an internal combustion engine is tested while the internal combustion engine is combusting fuel, but may be adapted to a so-called motoring test to test an internal combustion engine E while the internal combustion engine is not combusting fuel. In the case where an internal combustion engine is run in a non-combustion state at the time of conducting the motoring test, the exhaust itself is present while the exhaust gas otherwise produced by the combustion is not, so that the exhaust should be treated.

The invention is not limited to an internal combustion engine which has cylinders arranged in a V shape and an internal combustion engine which has inline cylinders, but can be adapted to an internal combustion engine of any structure. The structure of the exhaust treatment apparatus is not limited to the illustrated structures of the individual embodiments, but may be embodied in other specific forms within the scope of the invention.

The invention claimed is:

1. An exhaust treatment apparatus for treating exhaust discharged from an exhaust port of an internal combustion engine when testing the internal combustion engine, comprising:
    an exhaust inlet portion having an inlet port through which exhaust discharged from the exhaust port is introduced; and
    a displacement mechanism which displaces the exhaust inlet portion between a first position proximate the exhaust port and a second position spaced away from the exhaust port; and
    a test bed having a restriction mechanism which restricts rocking of the internal combustion engine;
    wherein the test bed is equipped with the displacement mechanism;
    and wherein the displacement mechanism comprises an arm supported on the test bed in such a way as to be able to rotate around a predetermined rotational axis; and
    an actuator for rotating the arm,
    wherein the exhaust inlet portion is provided on the arm.

2. The exhaust treatment apparatus according to claim 1, further comprising a pressing mechanism which when the displacement mechanism is in the first position presses the exhaust inlet portion toward the internal combustion engine in order to place the inlet port in close contact with the exhaust port.

3. The exhaust treatment apparatus according to claim 2, wherein the exhaust inlet portion is attached to the displacement mechanism via the pressing mechanism, and with the exhaust inlet portion in the first position proximate the internal combustion engine with a predetermined gap therebetween by the displacement mechanism, the pressing mechanism presses the exhaust inlet portion toward the internal combustion engine.

4. The exhaust treatment apparatus according to claim 1, further comprising:
    an exhaust treatment section for treating the exhaust; and
    an exhaust pipe which connects the exhaust inlet portion to the exhaust treatment section to lead exhaust, introduced to the exhaust port, to the exhaust treatment section.

5. The exhaust treatment apparatus according to claim 1, wherein the restriction mechanism is a clamp mechanism to clamp the internal combustion engine.

6. The exhaust treatment apparatus according to claim 1, wherein the exhaust inlet portion is attached to the displacement mechanism in a detachable manner.

7. The exhaust treatment apparatus according to claim 1, wherein the displacement mechanism comprises an elongated rotatably-mounted arm with the exhaust inlet portion provided at a distal end of the arm to rotate between the first position and the second position.

8. The exhaust treatment apparatus according to claim 1, wherein the exhaust inlet portion is provided with a seal member in such a way as to surround the inlet port, and in the first position the seal member seals between the exhaust inlet portion and the internal combustion engine.

9. The exhaust treatment apparatus according to claim 8, wherein the seal member is made of a heat resistant and resilient material.

10. The exhaust treatment apparatus according to claim 9, wherein the seal member is made of a fluorine-based rubber material.

11. An exhaust treatment apparatus comprising:
    an exhaust inlet portion having an inlet port through which exhaust discharged from the exhaust port is introduced; and
    a displacement mechanism which displaces the exhaust inlet portion between a first position proximate the exhaust port and a second position spaced away from the exhaust port; and a test bed having a restriction mechanism which restricts rocking of the internal combustion engine;

wherein the test bed is equipped with the displacement mechanism;

and wherein the displacement mechanism comprises an arm supported on the test bed in such a way as to be able to rotate around a predetermined rotational axis; and a test bed having a restriction mechanism which restricts rocking of the internal combustion engine;

wherein the test bed is equipped with the displacement mechanism; and wherein the displacement mechanism comprises:

a slide mechanism provided upright on the test bed; and an arm which is supported in such a manner as to be liftable up and down with respect to the slide mechanism and is lifted up and down by the slide mechanism, wherein the exhaust inlet portion is provided on the arm.

* * * * *